United States Patent
Yoshisaka et al.

(10) Patent No.: US 10,641,376 B2
(45) Date of Patent: May 5, 2020

(54) DIFFERENTIAL DEVICE AND METHOD OF ADJUSTING DIFFERENTIAL DEVICE

(71) Applicant: JTEKT CORPORATION, Osaka-shi (JP)

(72) Inventors: Tadashi Yoshisaka, Kariya (JP); He Jin, Kariya (JP); Yasunori Kamitani, Fujimi (JP)

(73) Assignee: JTEKT CORPORATION, Osaka-shi (JP)

( * ) Notice: Subject to any disclaimer, the term of this patent is extended or adjusted under 35 U.S.C. 154(b) by 121 days.

(21) Appl. No.: 16/049,227

(22) Filed: Jul. 30, 2018

(65) Prior Publication Data
US 2019/0032762 A1   Jan. 31, 2019

(30) Foreign Application Priority Data
Jul. 31, 2017  (JP) .................. 2017-148273

(51) Int. Cl.
*F16H 48/40*  (2012.01)
*F16H 48/08*  (2006.01)
*F16H 48/34*  (2012.01)
*F16H 48/24*  (2006.01)
*F16H 48/10*  (2012.01)

(52) U.S. Cl.
CPC ............. *F16H 48/40* (2013.01); *F16H 48/08* (2013.01); *F16H 48/24* (2013.01); *F16H 48/34* (2013.01); *F16H 2048/106* (2013.01); *F16H 2048/346* (2013.01)

(58) Field of Classification Search
CPC .......... F16H 48/08; F16H 48/24; F16H 48/34; F16H 48/40; F16H 2048/106; F16H 2048/346
USPC .......................................................... 475/230
See application file for complete search history.

(56) References Cited

U.S. PATENT DOCUMENTS

| | | | | |
|---|---|---|---|---|
| 7,264,568 B2* | 9/2007 | Ludwig | .................. | F16H 48/08 192/30 W |
| 7,602,271 B2* | 10/2009 | York | ...................... | F16H 48/08 324/207.2 |
| 9,625,026 B2* | 4/2017 | Cochren | ................. | F16H 48/34 |
| 9,885,408 B2* | 2/2018 | Bionaz | .................... | F16H 48/06 |
| 10,415,681 B2* | 9/2019 | Molde | ...................... | H01H 3/16 |
| 2005/0187063 A1 | 8/2005 | Haruki | | |

FOREIGN PATENT DOCUMENTS

JP    2005-240861    9/2005

* cited by examiner

*Primary Examiner* — Leslie A Nicholson, III
(74) *Attorney, Agent, or Firm* — Oblon, McClelland, Maier & Neustadt, L.L.P.

(57) ABSTRACT

A differential device has: a differential case supported so as to be rotatable with respect to a differential carrier fixed to the vehicle body; a differential gear mechanism composed of a plurality of pinion gears and side gears; pinion gear shafts that support the plurality of pinion gears; a tubular slide member that supports the pinion gear shafts in the differential case; an actuator that moves the slide member in the axial direction; and a position sensor that is attached to a sensor attachment member provided to the differential carrier and that is configured to detect an operating state of the actuator.

5 Claims, 13 Drawing Sheets

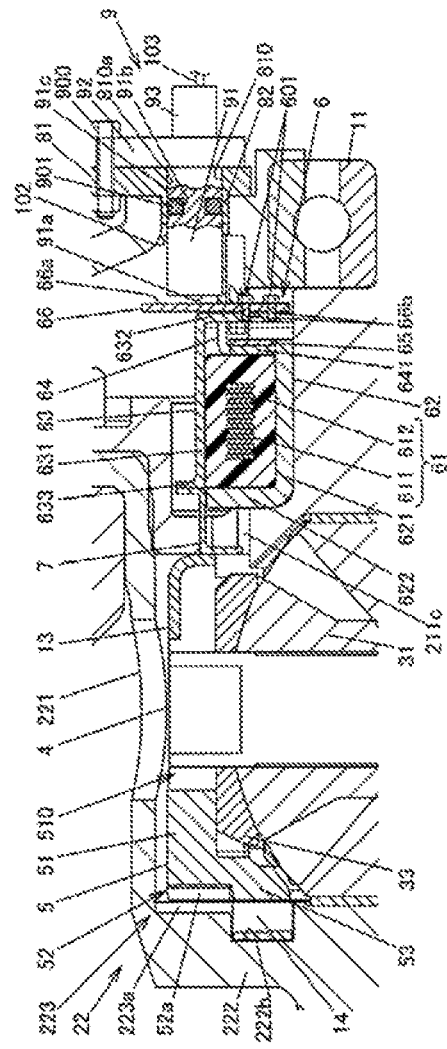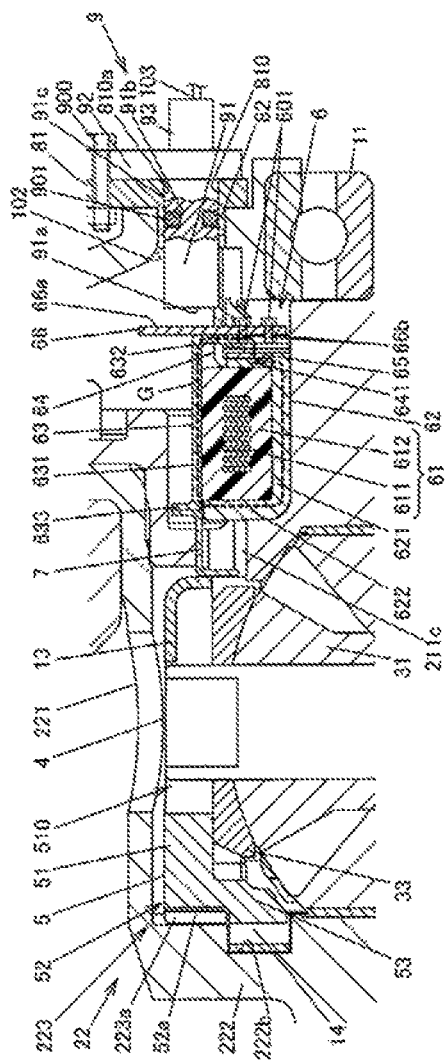

DIFFERENTIAL DEVICE AND METHOD OF ADJUSTING DIFFERENTIAL DEVICE

The disclosure of Japanese Patent Application No. 2017-148273 filed on Jul. 31, 2017 including the specification, drawings and abstract is incorporated herein by reference in its entirety.

BACKGROUND OF THE INVENTION

1. Field of the Invention

The present invention relates to a differential device including a differential mechanism that distributes an input drive force to a pair of output members while allowing differential motion, and to a method of adjusting the differential device.

2. Description of the Related Art

A differential device including a differential mechanism that distributes an input drive force to a pair of output members while allowing differential motion has hitherto been used to transfer a drive force of a drive source of a vehicle to right and left wheels, for example. In some of such differential devices, the operation state of the differential mechanism is switchable by an actuator. See Japanese Patent Application Publication No. 2005-240861 (JP 2005-240861 A), for example.

The differential device (differential motion restriction device) described in JP 2005-240861 A has a dog clutch that is capable of locking (restricting) differential motion between right and left side gears that serve as the pair of output members, and a linear electromagnetic solenoid that serves as the actuator which actuates the dog clutch. The dog clutch is constituted from a meshing gear portion formed on one of the side gears, and a meshing gear portion formed on a clutch piston supported so as to be movable in the rotational axis direction of the side gears with respect to a differential case. The linear electromagnetic solenoid has a yoke fixed to the differential case, a coil housed in the yoke, and a plunger provided so as to be movable in the rotational axis direction of the side gears by a magnetic force generated by energizing the coil.

When the coil is energized, a piston plate fixed to the clutch piston is pressed by the plunger, and the meshing gear portion of the clutch piston is meshed with the meshing gear portion of the one of the side gears to establish a differential lock state in which differential motion between the paired side gears is restricted. When the coil is de-energized, meanwhile, a return spring pushes back the clutch piston to cancel the differential lock state.

The differential device described in JP 2005-240861 A also has a position sensor (differential lock sensor) that is capable of detecting an operating state of the linear electromagnetic solenoid. The position sensor detects whether the linear electromagnetic solenoid is in a differential lock state or an unlocked state in accordance with the position of the piston plate, and is configured to have a sensor body fixed to a differential carrier and a position sensor portion that is movable with respect to the sensor body together with the piston plate.

In the differential device configured as described above, the position of the piston plate at which the position sensor is switched between the on state and the off state is affected by errors in the dimensions of the members of the differential device and errors in the assembly of such members. In the case where there is a significant error in the dimensions or the assembly, there may be caused a detection failure in which it cannot be accurately detected whether the linear electromagnetic solenoid is in a differential lock state or an unlocked state. In the case where such a detection failure is caused in the differential device described in JP 2005-240861 A, it is necessary to change the position of attachment of the sensor body through shim adjustment, for example. However, such adjustment work requires confirming the on/off state of the position sensor, and is troublesome.

SUMMARY OF THE INVENTION

It is an object of the present invention to provide a differential device that is configured to easy adjust the position of a position sensor that detects an operating state of an actuator, and a method of adjusting the differential device.

According to an aspect of the present invention, a differential device includes:

a differential mechanism that distributes an input drive force to a pair of output members while allowing differential motion;

a moving member that is configured to switch an operation state of the differential mechanism through advancing/retracting movement in an axial direction that is parallel to a rotational axis of the output members;

an actuator that moves the moving member in the axial direction;

a case member that houses the differential mechanism, the moving member, and the actuator; and a position sensor that is attached to a sensor attachment portion provided to the case member and that is configured to detect an operating state of the actuator.

The position sensor has an insertion portion, a distal end portion of which is disposed inside the case member, and a flange portion disposed outside the case member.

The sensor attachment portion has a through hole through which the insertion portion of the position sensor is inserted in the axial direction.

The insertion portion is configured to turn about a central axis of the through hole in a state in which the flange portion is not fixed to the sensor attachment portion.

A position, in the axial direction, of the distal end portion of the insertion portion of the position sensor is varied in accordance with a position of fixation of the flange portion to the sensor attachment portion.

According to another aspect of the present invention, a method of adjusting the differential device includes fixing the flange portion to the sensor attachment portion at a position of the position sensor in the axial direction at a time when a signal state of the position sensor is switched when the position of the position sensor in the axial direction is varied.

With the differential device and the method of adjusting the differential device according to the aspects described above, it is possible to easily adjust the position of a position sensor that detects an operating state of an actuator.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 3A and 3B are partial sectional views illustrating the differential device at the time when an actuator is not operating and when the actuator is operating, respectively;

DETAILED DESCRIPTION OF EMBODIMENTS

A first embodiment of the present invention will be described with reference to FIGS. 1 to 7.

Figure 1:
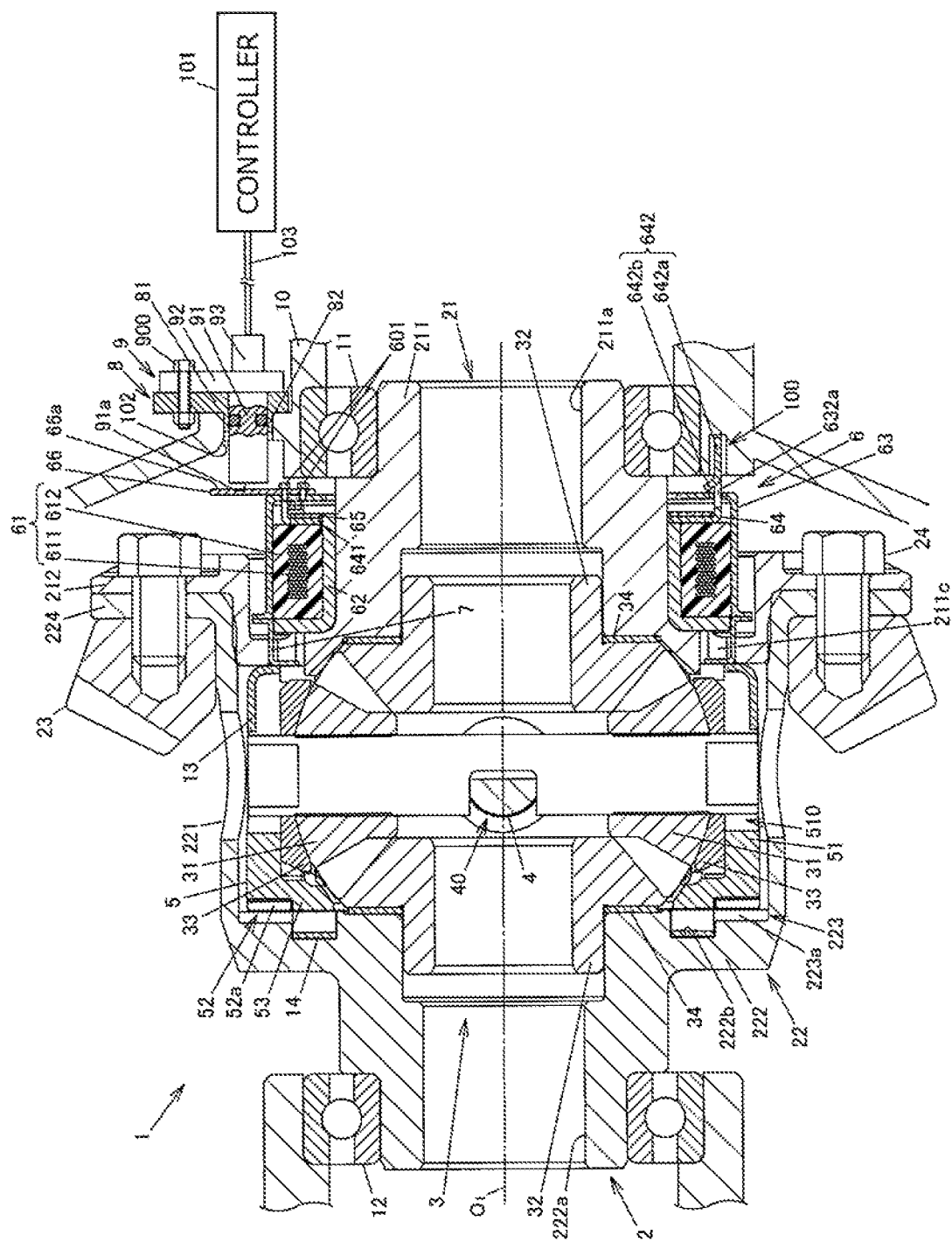
FIG. 1 is a sectional view illustrating an example of the configuration of a differential device according to an embodiment of the present invention.
Figure 2:
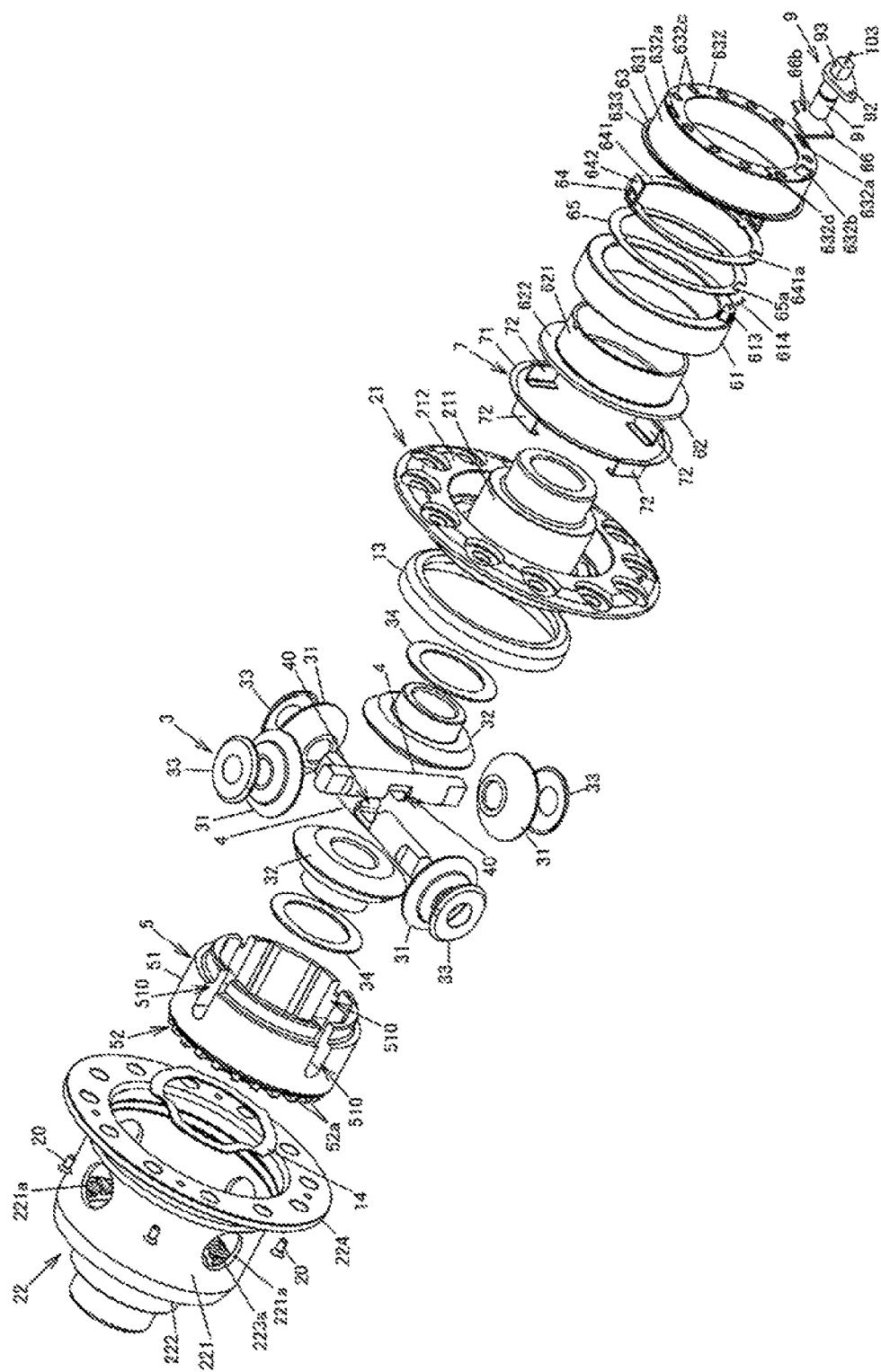
FIG. 2 is an exploded perspective view of the differential device.

FIG. 1 is a sectional view illustrating an example of the configuration of a differential device according to a first embodiment. FIG. 2 is an exploded perspective view of the differential device. FIGS. 3A and 3B are partial sectional views illustrating the differential device at the time when an actuator is not operating and when the actuator is operating, respectively.

A differential device 1 is used to distribute a drive force of a drive source such as an engine of a vehicle to a pair of output shafts (output members) while allowing differential motion. More specifically, the differential device 1 according to the present embodiment is mounted on a four-wheel-drive vehicle that includes a pair of right and left main drive wheels (e.g. front wheels) to which the drive force of the drive source is always transferred and a pair of right and left auxiliary drive wheels (e.g. rear wheels) to which the drive force of the drive source is transferred in accordance with the travel state. The differential device 1 is used as a differential device that distributes the drive force to the right and left auxiliary drive wheels. The vehicle is in a two-wheel-drive state in the case where the drive force is transferred to only the main drive wheels. The vehicle is in a four-wheel-drive state in the case where the drive force is transferred to the main drive wheels and the auxiliary drive wheels.

In the four-wheel-drive state, the differential device 1 distributes the input drive force to right and left drive shafts of the auxiliary drive wheels. In the two-wheel-drive state, meanwhile, the differential device 1 blocks transfer of the input drive force to the right and left drive shafts.

The differential device 1 has: a differential carrier 10 fixed to the vehicle body; a differential case 2 supported so as to be rotatable with respect to the differential carrier 10 via a pair of bearings 11 and 12; a differential gear mechanism 3 composed of a plurality of pinion gears 31 and side gears 32; pinion gear shafts 4 that support the pinion gears 31; a tubular slide member 5 that supports the pinion gear shafts 4 in the differential case 2; an actuator 6 that moves the slide member 5 in the axial direction which is parallel to a rotational axis $O_1$ of the differential case 2; a pressing member 7 that receives and transfers a moving force of the actuator 6 to the slide member 5; and a position sensor 9 that is attached to a sensor attachment member 8 provided to the differential carrier 10 and that is capable of detecting an operating state of the actuator 6. The differential carrier 10 houses the differential gear mechanism 3, the slide member 5, and the actuator 6.

The differential carrier 10 is an example of the case member according to the present invention. The differential gear mechanism 3 is an example of the differential mechanism according to the present invention. The slide member 5 is an example of the moving member according to the present invention.

Lubricating oil (differential oil) that lubricates the differential gear mechanism 3 is introduced into the differential case 2. The differential gear mechanism 3 is disposed inside the slide member 5. The actuator 6 is disposed outside the differential case 2. A part of the pressing member 7 is inserted through a through hole 211c formed in the differential case 2. With this configuration, the actuator 6 moves the slide member 5 with respect to the differential case 2 in the axial direction via the pressing member 7 from the outside of the differential case 2.

In the present embodiment, the slide member 5 supports two pinion gear shafts 4, and each of the two pinion gear shafts 4 supports two pinion gears 31. That is, in the present embodiment, the differential gear mechanism 3 is constituted by the four pinion gears 31 and a pair of side gears 32 meshed with the four pinion gears 31 with the gear axes of the pinion gears 31 and the side gears 32 orthogonal to each other. The pinion gears 31 and the side gears 32 have a plurality of gear teeth. In FIG. 2, however, such gear teeth are not illustrated.

As illustrated in FIG. 2, the pinion gear shafts 4 are each formed in a shaft shape as a whole, and both end portions of the pinion gear shafts 4 are inserted through two pinion gears 31. The two pinion gear shafts 4 are fitted and meshed with each other at recessed portions 40 formed at the middle portions, in the axial direction, of the pinion gear shafts 4. The two pinion gear shafts 4 are orthogonal to each other in the case where the pinion gear shafts 4 are seen along the rotational axis $O_1$ of the differential case 2.

The slide member 5 has a tubular shape, the central axis of which coincides with the rotational axis $O_1$ of the differential case 2, and is disposed so as to be movable in the axial direction with respect to the differential case 2. The slide member 5 has: a cylindrical portion 51 formed in a cylindrical shape; a meshing portion 52 composed of a plurality of dog teeth (meshing teeth) 52*a*; and an inner rib portion 53 provided on the radially inner side of the meshing portion 52. The cylindrical portion 51, the meshing portion 52, and the inner rib portion 53 are integral with each other. A washer 33 is disposed between the inner peripheral surface of the cylindrical portion 51 of the slide member 5 and each pinion gear 31.

The meshing portion 52 is formed on one side, in the axial direction, of the cylindrical portion 51. The dog teeth 52*a* project in the axial direction. The cylindrical portion 51 has a plurality of long holes 510 that extend in the axial direction, that penetrate between the inner and outer peripheral surfaces of the cylindrical portion 51, and that open toward the other side of the cylindrical portion 51 in the axial direction, which is the opposite side from the meshing portion 52. In the present embodiment, the cylindrical portion 51 is provided with four long holes 510. The long holes 510 are fitted with the pinion gear shafts 4. Consequently, the slide member 5 is movable in the axial direction relative to the pinion gear shafts 4, and rotatable together with the pinion gear shafts 4.

When the slide member 5 receives a moving force of the actuator 6 to be moved in the axial direction, the meshing portion 52 is meshed with a meshed portion 223 (to be discussed later) of the differential case 2 in the circumferential direction. In this event, an axial end surface of the inner rib portion 53 abuts against a return spring 14 to receive the urging force of the return spring 14.

The pressing member 7 has: a ring portion 71 disposed outside the differential case 2; and a plurality of projecting pieces 72 provided to extend from the ring portion 71 in parallel with the rotational axis $O_1$ of the differential case 2. In the present embodiment, the pressing member 7 is provided with four projecting pieces 72. The pressing member 7 is formed by pressing a steel plate. The distal end portions (end portions remote from the base end portions gear the ring portion 71) of the projecting pieces 72 are bent inward in the radial direction of the ring portion 71. The pressing member 7 is rotated together with a first case member 21 to be discussed later.

A reinforcing ring 13 that suppresses deformation of the slide member 5 due to a torque reaction force from the pinion gear shafts 4 is disposed between the pressing member 7 and the slide member 5. The reinforcing ring 13 is made of a steel material that is the same as that of the slide member 5, for example, and formed in an L-shape in section.

The actuator 6 has: an annular electromagnet 61 that has a coil 611 and a molded resin portion 612 molded with the coil 611 embedded therein; a yoke 62 that serves as a magnetic path for magnetic flux of the electromagnet 61 generated by energizing the coil 611; and an armature 63 that makes sliding contact with the molded resin portion 612 to be guided in the direction of the rotational axis $O_1$ of the differential case 2. The section of the molded resin portion 612 taken along the rotational axis $O_1$ has a rectangular shape. The meshing portion 52 of the slide member 5 is meshed with the meshed portion 223 by a moving force of the actuator 6 transferred via the pressing member 7 and the reinforcing ring 13.

The coil 611 of the electromagnet 61 generates magnetic flux when an excitation current is supplied from a controller 101. The actuator 6 operates when an excitation current is supplied to the coil 611. As illustrated in FIG. 2, the electromagnet 61 is provided with a boss portion 613 that projects from one end surface in the axial direction, and a wire 614 that supplies the excitation current to the coil 611 is led out from the boss portion 613.

The yoke 62 is made of soft magnetic metal such as low-carbon steel, and has: a cylindrical portion 621 that covers the inner peripheral surface of the molded resin portion 612 from the inner side; and a rib portion 622 that projects outward from one end portion, in the axial direction, of the cylindrical portion 621 to cover one axial end surface of the molded resin portion 612. The cylindrical portion 621 and the rib portion 622 are integral with each other.

A rotation prevention member 64 and a stopper ring 65 are disposed at an end portion of the cylindrical portion 621 of the yoke 62 on the opposite side from the rib portion 622. The rotation prevention member 64 is engaged with the yoke 62 so as not to be relatively rotatable. The stopper ring 65 retains the electromagnet 61 and the rotation prevention member 64 on the yoke 62. The rotation prevention member 64 is made of non-magnetic metal such as austenitic stainless steel, and has: an annular portion 641 disposed at the outer periphery of the cylindrical portion 621 of the yoke 62; and a pair of protruding portions 642 provided at two locations in the circumferential direction to project in the axial direction from the annular portion 641. The annular portion 641 and the protruding portions 642 are integral with each other.

The rotation prevention member 64 prevents rotation of the yoke 62 with the protruding portions 642 engaged with recessed portions 100 formed in the differential carrier 10, and restricts axial movement of the yoke 62. The protruding portions 642 of the rotation prevention member 64 are inserted through insertion through holes 632*a* formed in the armature 63 to extend in the axial direction to prevent rotation of the armature 63 with respect to the yoke 62 and the differential carrier 10. The protruding portions 642 each have: a plate portion 642*a* in a flat plate shape inserted through the insertion through hole 632*a* of the armature 63; and a retention protrusion 642*b* disposed closer to the recessed portion 100 of the differential carrier 10 than the insertion through bole 632*a* to restrict axial movement of the armature 63 with respect to the yoke 62. In the present embodiment, the retention protrusion 642*b* is formed by cutting and raising a part of the plate portion 642*a*.

The stopper ring 65 is disposed at a position at which the annular portion 641 of the rotation prevention member 64 is interposed between the electromagnet 61 and the stopper ring 65, and fixed to the cylindrical portion 621 of the yoke 62 by welding, for example. The stopper ring 65 and the annular portion 641 of the rotation prevention member 64 have notches 65*a* and 641*a*, respectively, with which the boss portion 613 which is provided on the molded resin portion 612 of the electromagnet 61 is fitted.

The armature 63 is made of soft magnetic metal such as low-carbon steel, and has: an outer annular portion 631 disposed at the outer periphery of the electromagnet 61; a side plate portion 632 formed so as to project inward from one end portion, in the axial direction, of the outer annular portion 631; and a flange portion 633 formed so as to project outward from the other end portion, in the axial direction, of the outer annular portion 631. The outer annular portion 631, the side plate portion 632, and the flange portion 633 are integral with each other.

The side plate portion 632 of the armature 63 has: two insertion through holes 632a, through which the respective protruding portions 642 of the rotation prevention member 64 are inserted; a through hole 632b penetrated by the boss portion 613 of the electromagnet 61; and a plurality of (ten in the example illustrated in FIG. 2) oil holes 632c that allow a flow of lubricating oil.

A detected plate 66 to be detected by the position sensor 9 is attached to the side plate portion 632 of the armature 63. The detected plate 66 is fixed to the side plate portion 632 by two bolts 601. The two bolts 601 are inserted through two bolt holes 632d (illustrated in FIG. 2) formed in the side plate portion 632 and two through holes 66b formed in the detected plate 66.

The detected plate 66 is made of a magnetic material such as iron, has a plate shape, and has a detected surface 66a that faces a detection surface 91a of the position sensor 9. The detected surface 66a is perpendicular to the rotational axis $O_1$. A predetermined gap is provided between the detection surface 91a of the position sensor 9 and the detected surface 66a.

The differential case 2 has a first case member 21 in a disc shape and a second case member 22 in a bottomed cylindrical shape. The first case member 21 blocks the opening of the second case member 22. A washer 34 in an annular plate shape is disposed in the differential gear mechanism 3 between the pair of side gears 32 and the first case member 21 and between the pair of side gears 32 and the second case member 22.

The second case member 22 has: a cylindrical portion 221 that houses the differential gear mechanism 3 and the slide member 5 therein; a bottom portion 222 that extends inward from one end portion, in the axial direction, of the cylindrical portion 221; the meshed portion 223 with which the meshing portion 52 of the slide member 5 is meshed; and a flange portion 224 that extends outward from the other end portion, in the axial direction, of the cylindrical portion 221. The cylindrical portion 221, the bottom portion 222, the meshed portion 223, and the flange portion 224 are integral with each other.

The cylindrical portion 221 has a plurality of oil holes 221a that allow a flow of lubricating oil. The bottom portion 222 has: a shaft insertion hole 222a, into which a drive shaft coupled to one of the side gears 32 so as not to be relatively rotatable is inserted; and an annular groove 222b that houses the return spring 14. In the present embodiment, the return spring 14 is constituted of a wave washer, and housed in the annular groove 222b as compressed in the axial direction. The meshed portion 223 is composed of multiple dog teeth 223a provided at equal intervals along the circumferential direction, and provided gear the bottom portion 222 of the second case member 22. The return spring 14 urges the slide member 5 in the direction of moving the slide member 5 away from the bottom portion 222 of the second case member 22.

The first case member 21 has: a cylindrical portion 211 opposed to the bottom portion 222 of the second case member 22 in the axial direction; and a flange portion 212 brought into abutment with the flange portion 224 of the second case member 22. The cylindrical portion 211 and the flange portion 212 are integral with each other.

The flange portion 212 of the first case member 21 and the flange portion 224 of the second case member 22 are coupled to each other by a plurality of screws 20 (see FIG. 2). The cylindrical portion 211 has a shaft insertion hole 211a, into which a drive shaft coupled to the other of the side gears 32 so as not to be relatively rotatable is inserted.

A drive force is input to the differential case 2 from an annular ring gear 23 (see FIG. 1) fixed to the flange portions 212 and 224 of the first and second case members 21 and 22, respectively. The ring gear 23 is fixed to a portion of the outer periphery of the cylindrical portion 221 of the second case member 22, which is gear the flange portion 224. The ring gear 23 is fixed by a plurality of fastening bolts 24 so as to rotate together with the differential case 2.

The position sensor 9 is a non-contact magnetic sensor that magnetically detects the position, in the axial direction, of the armature 63 and the detected plate 66, and outputs an electric signal that matches variations in the magnetic flux density to the controller 101 via a wire 103. The position sensor 9 is set such that the signal state of the position sensor 9 is switched on and off in accordance with the distance between the detection surface 91a of the position sensor 9 and the detected surface 66a of the detected plate 66.

As illustrated in FIG. 3, the position sensor 9 has: an insertion portion 91, the distal end portion of which is disposed inside the differential carrier 10; a flange portion 92 disposed outside the differential carrier 10; and an operation portion 93 disposed on the opposite side of the flange portion 92 from the insertion portion 91. The flange portion 92 of the position sensor 9 is fixed to the sensor attachment member 8 by a bolt 900. The sensor attachment member 8 is an example of the sensor attachment portion according to the present invention.

The distal end surface, in the axial direction, of the insertion portion 91 of the position sensor 9 is formed as the detection surface 91a which detects magnetic flux that snatches the distance, in the axial direction, from the detected plate 66.

The position sensor 9 is fixed to the differential carrier 10 via the sensor attachment member 8 which is attached to the differential carrier 10. The sensor attachment member 8 has: a body portion 81 interposed between the differential carrier 10 and the flange portion 92 of the position sensor 9; and a cylindrical portion 82 inserted through an attachment hole 102 formed in the differential carrier 10. The sensor attachment member 8 has a through hole 810 that allows the insertion portion 91 of the position sensor 9 to be inserted therethrough in the axial direction. The position sensor 9 is turnable about the central axis of the through hole 810 in a state in which the flange portion 92 is not fixed to the sensor attachment member 8.

An annular groove 91b, in which an O-ring 901 is disposed, is formed in an outer peripheral surface 91c of the insertion portion 91 that faces an inner peripheral surface 810a (see FIGS. 3 and 4 to be discussed later) of the through hole 810 in the sensor attachment member 8. Consequently, a space between the position sensor 9 and the sensor attachment member 8 is sealed.

Next, operation of the differential device 1 will be described with reference to FIGS. 3A and 3B. The differential device 1 is switched between a coupled state and a non-coupled state in accordance with whether the actuator 6 is operating or is not operating. In the coupled state, the slide member 5 and the differential case 2 are coupled so as not to be rotatable relative to each other with the dog teeth 52a of the meshing portion 52 and the dog teeth 223a of the meshed portion 223 meshed with each other in the circumferential direction. In the non-coupled state, the slide member 5 and the differential case 2 are rotatable relative to each other.

When the actuator 6 is not operating with no excitation current supplied to the coil 611 of the electromagnet 61, the slide member 5 is moved toward the cylindrical portion 211 of the first case member 21 by the restoring force of the return spring 14, which releases meshing between the meshing portion 52 of the slide member 5 and the meshed portion 223 of the differential case 2. When the electromagnet 61 is de-energized, the armature 63 is returned to a position, at which the armature 63 is away from the bottom portion 222, by the restoring force of the return spring 14 which is transferred via the slide member 5, the reinforcing ring 13, and the pressing member 7.

When the actuator 6 is not operating, the differential case 2 and the slide member 5 are rotatable relative to each other, and thus transfer of a drive force from the differential case 2 to the differential gear mechanism 3 is blocked. Consequently, the vehicle is brought into the two-wheel-drive state with the drive force which is input from the ring gear 23 to the differential case 2 not transferred to the drive shafts.

When an excitation current is supplied to the coil 611 of the electromagnet 61, on the other hand, magnetic flux is generated in a magnetic path G indicated by the dashed line in FIG. 3B. The armature 63 then is moved toward the second case member 22 in the axial direction by the magnetic force of the electromagnet 61. Consequently, the pressing member 7 presses the slide member 5 toward the bottom portion 222 of the second case member 22 via the reinforcing ring 13, which moves the slide member 5 to a position at which the meshing portion 52 and the meshed portion 223 are meshed with each other. The position of the armature 63 is detected by the position sensor 9 which is fixed to the differential carrier 10.

When the meshing portion 52 and the meshed portion 223 are meshed with each other, the vehicle is brought into the four-wheel-drive state with the drive force which is input from the ring gear 23 to the second case member 22 of the differential case 2 transferred to the drive shafts via the slide member 5, the pinion gear shafts 4 of the differential gear mechanism 3, the four pinion gears 31, and the side gears 32.

When the actuator 6 is brought from the non-operating state into the operating state, the controller 101 supplies the electromagnet 61 with an excitation current with a large current value that enables rapid movement of the slide member 5. After that, when it is determined on the basis of an output signal from the position sensor 9 that the meshing portion 52 and the meshed portion 223 are meshed with each other, the current value of the excitation current is reduced to a relatively small current value that can still maintain the state in which the meshing portion 52 and the meshed portion 223 are meshed with each other. Consequently, power consumption can be reduced.

Figure 4:
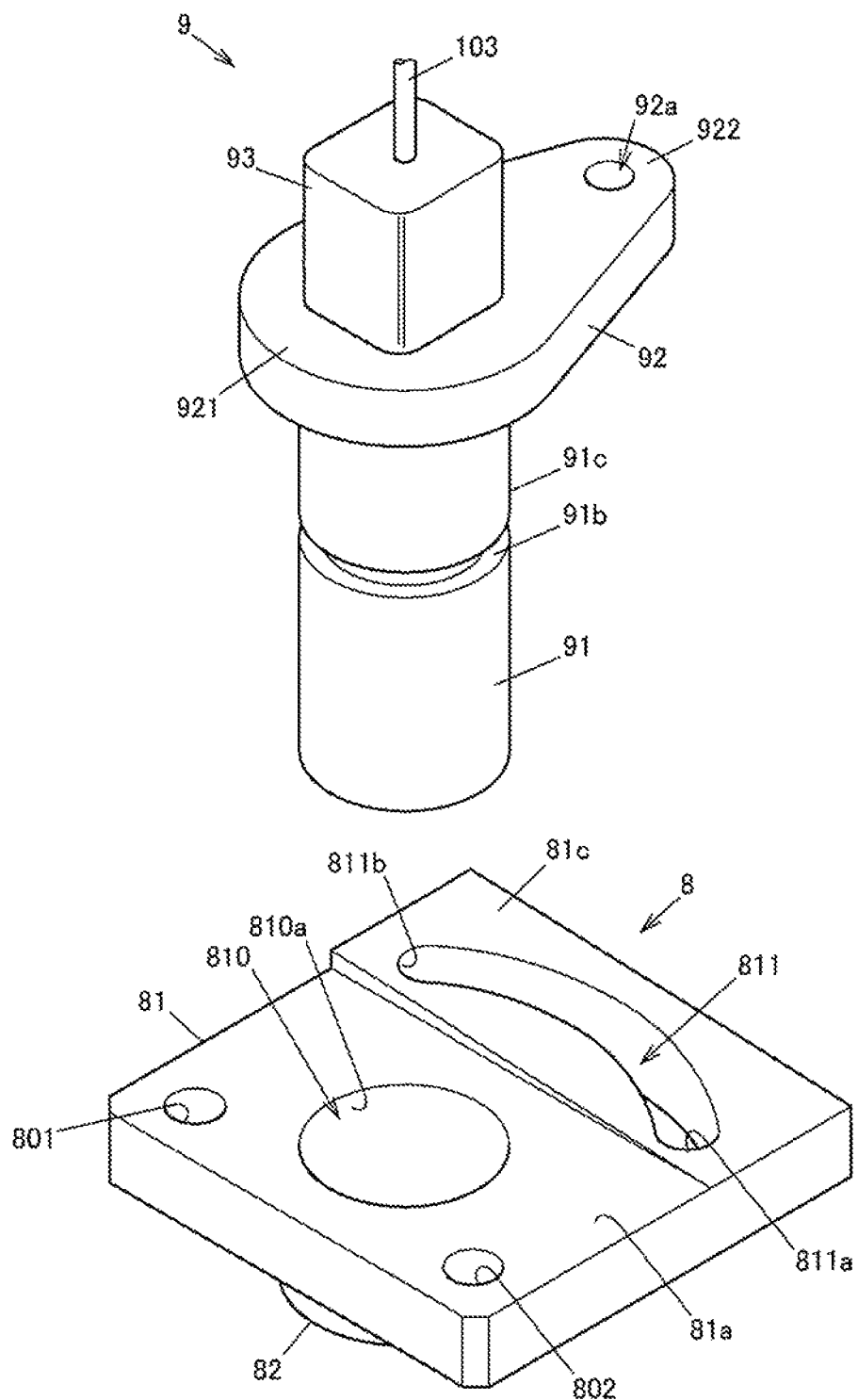
FIG. 4 is a perspective view illustrating an example of the configuration of a sensor attachment member and a position sensor 9.
Figure 5A:
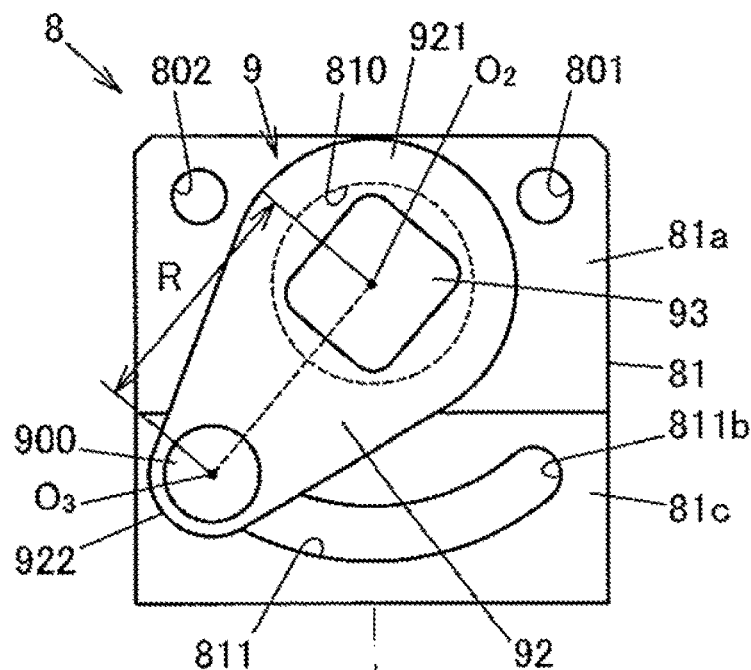
FIGS. 5A and 5B are a plan view and a side view, respectively, illustrating an example of the configuration of the position sensor and the sensor attachment member, illustrating a state in which the position sensor is positioned on one end side of the sensor attachment member.
Figure 5B:
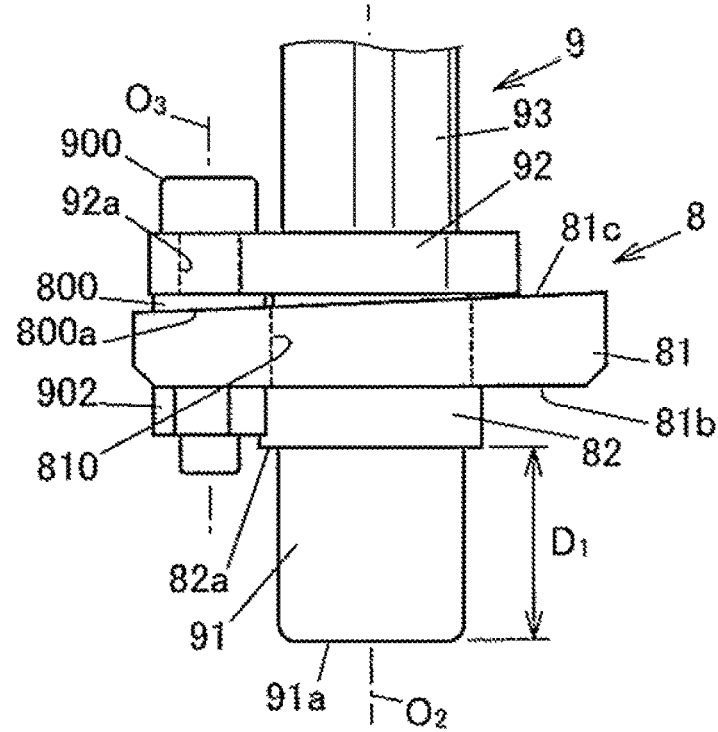
Figure 6A:
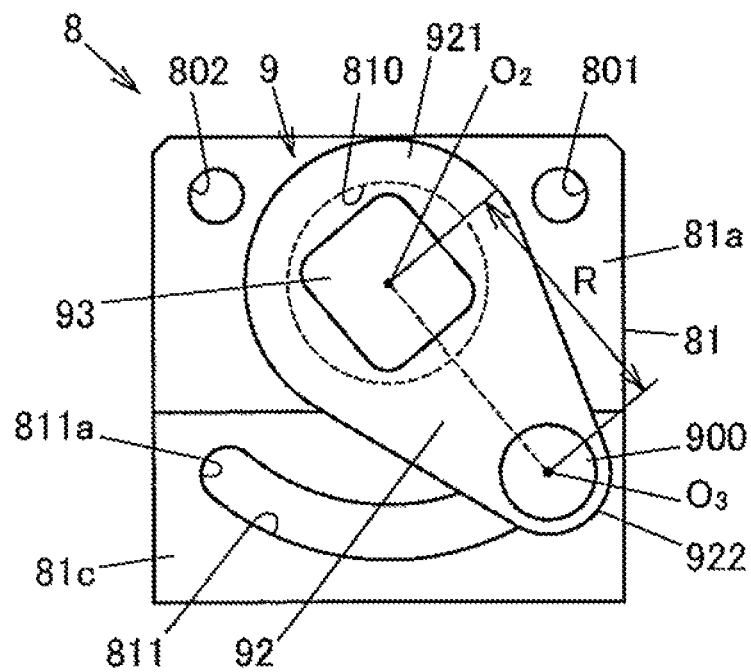
FIGS. 6A and 6B are a plan view and a side view, respectively, illustrating an example of the configuration of the position sensor and the sensor attachment member, illustrating a state in which the position sensor is positioned on the other end side of the sensor attachment member.
Figure 6B:
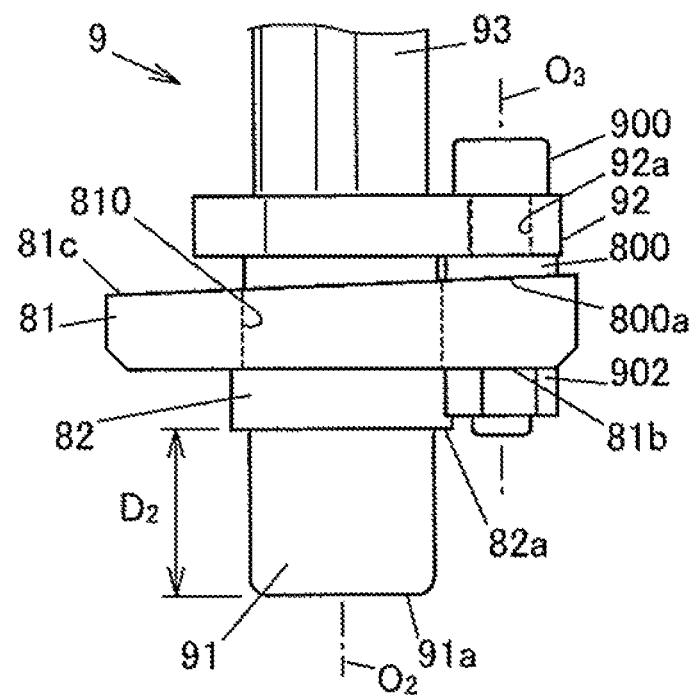

Next, the sensor attachment member 8 and the position sensor 9 will be described in detail with reference to FIGS. 4 to 6B. FIG. 4 is a perspective view illustrating an example of the configuration of the sensor attachment member 8 and the position sensor 9. FIGS. 5A and 5B are a plan view and a side view, respectively, illustrating an example of the configuration of the sensor attachment member 8 and the position sensor 9, illustrating a state in which the position sensor 9 is turned to one side of the sensor attachment member 8. FIGS. 6A and 6B are a plan view and a side view, respectively, illustrating an example of the configuration of the sensor attachment member 8 and the position sensor 9, illustrating a state in which the position sensor 9 is turned to the other side of the sensor attachment member 8.

The sensor attachment member 8 has the body portion 81 in a plate shape and the cylindrical portion 82 in a cylindrical shape. The body portion 81 and the cylindrical portion 82 are integral with each other. An opening end surface 81a of the body portion 81, which is around the opening of the through hole 810 and is adjacent to the flange portion 92, is a flat surface that extends along a direction that is orthogonal to the axial direction of the insertion portion 91 of the position sensor 9. The opening end surface 81a faces the flange portion 92 of the position sensor 9. The cylindrical portion 82 is provided so as to project from an end surface 81b of the body portion 81 on the opposite side from the opening end surface 81a. The flange portion 92 of the position sensor 9 has an insertion through hole 92a through which the bolt 900 is inserted.

The body portion 81 has a long hole 811 that extends arcuately about a central axis $O_2$ of the through hole 810. The body portion 81 also has two insertion through holes 801 and 802 through which bolts (not illustrated) are inserted for fixation to the differential carrier 10. The flange portion 92 is fixed to the sensor attachment member 8 by the bolt 900 which serves as a fixing member in a shaft shape inserted through the long hole 811. The fixing member may be a rivet, for example, rather than a bolt.

The opening end surface of the long hole 811 the body portion 81 is an inclined surface 81c inclined at a predetermined angle with respect to the circumferential direction about the central axis $O_2$ of the through hole 810. The insertion portion 91 of the position sensor 9 is turnable in a predetermined angular range about the central axis $O_2$ of the through hole 810 in a state in which the flange portion 92 is not fixed to the sensor attachment member 8, and the flange portion 92 is fixed to the inclined surface 81c of the body portion 81 at any position in the circumferential direction about the central axis $O_2$. The flange portion 92 has: a rotary end 921 that is rotated when the insertion portion 91 is turned; and a moving end 922 that is moved along the long hole 811 when the insertion portion 91 is turned. The predetermined angular range refers to an angle that matches the distance over which the moving end 922 of the flange portion 92 is moved between one end 811a and the other end 811b in the circumferential direction of the long hole 811.

When the insertion portion 91 is turned about the central axis $O_2$ of the through hole 810 in a state in which the position sensor 9 is not fixed to the sensor attachment member 8, the position of the position sensor 9 in the axial direction is varied in accordance with the inclined surface 81c. More specifically, when the amount of projection of the insertion portion 91 from an axial end surface 82a of the cylindrical portion 82 of the sensor attachment member 8 at the time when the moving end 922 of the flange portion 92 of the position sensor 9 is positioned at the one end 811a of the long hole 811 is defined as D1, and when the amount of projection of the insertion portion 91 from the axial end surface 82a of the cylindrical portion 82 of the sensor attachment member 8 at the time when the moving end 922 of the flange portion 92 of the position sensor 9 is positioned at the other end 811b of the long hole 811 is defined as D2, the amount of projection D1 is larger than the amount of projection D2 (D1>D2). That is, the position, in the axial direction, of the distal end portion of the insertion portion 91 of the position sensor 9 is varied in accordance with the position of fixation of the flange portion 92 to the sensor attachment member 8.

Thus, a margin for adjustment of the amount of projection of the insertion portion 91 from the sensor attachment member 8 is varied in accordance with the inclination angle of the inclined surface 81c of the sensor attachment member 8. That is, a distance d (D1−D2) over which adjustment can be made in the axial direction of the position sensor 9 is increased as the inclination angle of the inclined surface 81c is larger, and the distance d (D1–D2) over which adjustment can be made in the axial direction of the position sensor 9 is reduced as the inclination angle of the inclined surface 81c is smaller. The inclination angle of the inclined surface 81c is set to such an angle that the detection surface 91a of the insertion portion 91 does not contact the detected surface 66a of the detected plate 66 when the moving end 922 of the flange portion 92 is moved from the one end 811a of the long hole 811 to the other end 811b.

A washer 800, through which the bolt 900 is inserted, is disposed between the flange portion 92 of the position sensor 9 and the sensor attachment member 8. An end surface 800a of the washer 800 adjacent to the sensor attachment member 8 in the axial direction is an inclined surface that extends along the inclined surface 81c. When the insertion portion 91 of the position sensor 9 is rotated, the washer 800 is moved together with the moving end 922 of the flange portion 92 to be slid on the inclined surface 81c of the sensor attachment member 8.

When the moving end 922 of the flange portion 92 is moved between the one end 811a and the other end 811b of the long hole 811, a central axis $O_3$ of the bolt 900 is moved so as to draw an arcuate locus with a radius R (the distance between the central axis $O_2$ of the through hole 810 and the central axis $O_3$ of the bolt 900). In this way, the flange portion 92 can be fixed to the sensor attachment member 8 at different positions at which the flange portion 92 is equidistant from the central axis $O_2$ of the through hole 810.

Figure 7A:
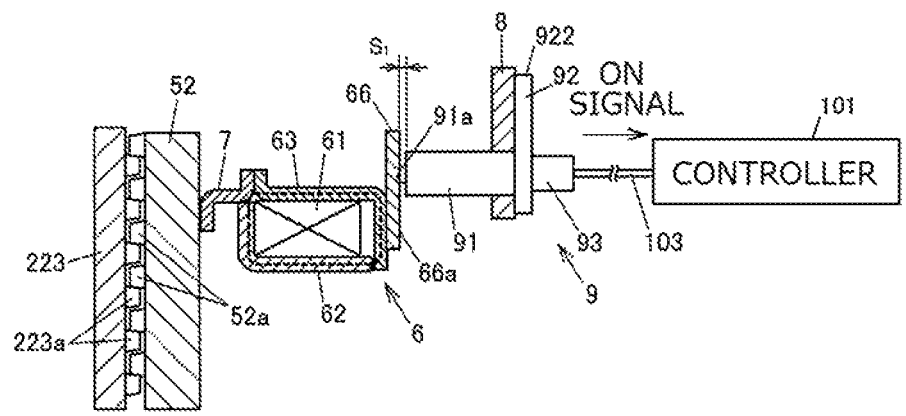
FIGS. 7A, 7B, and 7C schematically illustrate an example of a position sensor attachment process.
Figure 7B:
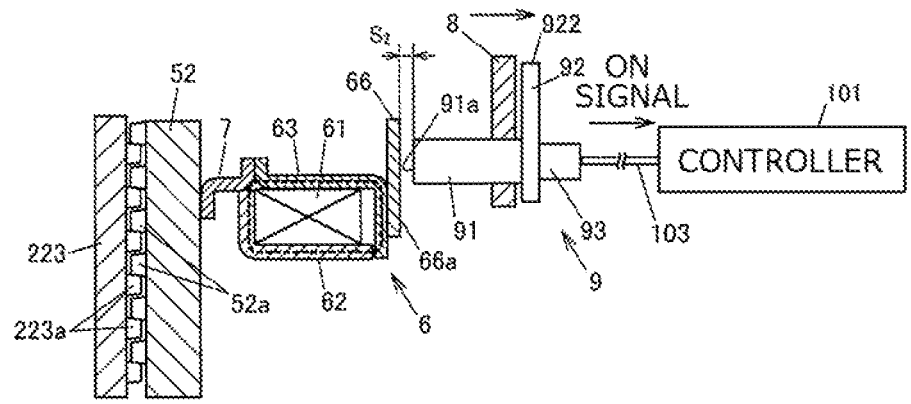
Figure 7C:
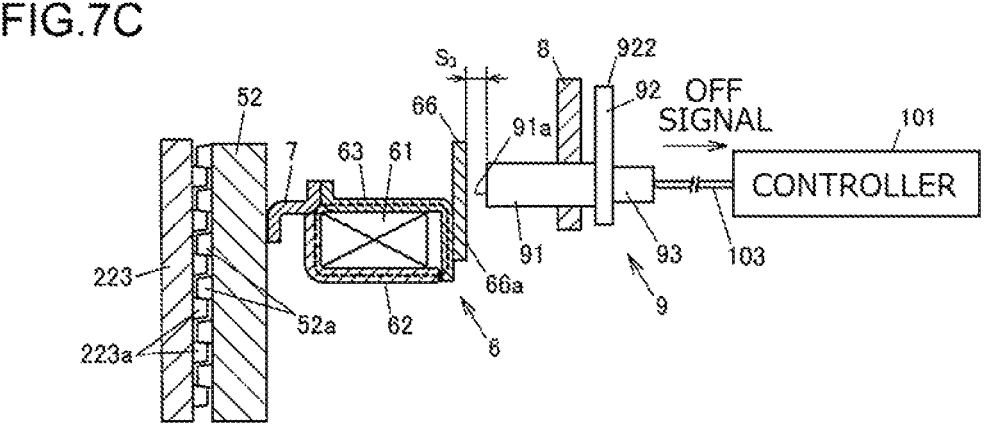

Next, a method of adjusting the position of the position sensor 9 in the axial direction will be described with reference to FIGS. 7A to 7C. FIGS. 7A, 7B, and 7C illustrate an example of a process for position adjustment of the position sensor 9. FIG. 7A illustrates a preparation process for position adjustment of the position sensor 9. FIG. 7B illustrates an intermediate process. FIG. 7C illustrates a fixing process in which the position sensor 9 is fixed to the sensor attachment member 8 after the position adjustment is completed. The differential device 1 is in a coupled state in all the processes illustrated FIGS. 7A, 7B, and 7C.

First, as illustrated in FIG. 7A, an excitation current is supplied to the electromagnet 61 to establish a coupled state in which the dog teeth 52a of the meshing portion 52 and the dog teeth 223a of the meshed portion 223 are meshed with each other in the circumferential direction. The moving end 922 of the flange portion 92 of the position sensor 9 is disposed at the one end 811a of the long hole 811. That is, in the preparation process, the position sensor 9 is located closest to the detected plate 66 with the differential device 1 in the coupled state. In this event, the position sensor 9 outputs an electric signal for the on state to the controller 101. The distance, in the axial direction, between the detection surface 91a of the position sensor 9 and the detected surface 66a of the detected plate 66 is defined as $S_1$.

FIG. 7B illustrates a state in which the insertion portion 91 of the position sensor 9 is turned by a predetermined angle about the central axis $O_2$ so that the detection surface 91a of the insertion portion 91 of the position sensor 9 is moved in the direction away from the detected surface 66a of the detected plate 66. In this state, a distance $S_2$, in the axial direction, between the detection surface 91a of the position sensor 9 and the detected surface 66a of the detected plate 66 is longer than the distance $S_1$, but an electric signal for the on state is still output from the position sensor 9.

FIG. 7C illustrates a state in which the insertion portion 91 of the position sensor 9 is further turned, so that a distance $S_3$ between the detection surface 91a of the insertion portion 91 and the detected surface 66a of the detected plate 66 is further longer and the electric signal which is output from the position sensor 9 is switched from the on state to the off state. When the signal state of the position sensor 9 is switched from the on state to the off state in this manner, turning of the insertion portion 91 of the position sensor 9 is stopped, and the position sensor 9 is fixed to the sensor attachment member 8 by fastening the bolt 900 to a nut 902. Consequently, the fixing process in the process of adjusting the position sensor 9 is completed. In this way, the position of the position sensor 9 at the time when the signal state of the position sensor 9 is switched is determined as the position of fixation.

As described above, in adjusting the position of the position sensor 9 in the axial direction, the position of the position sensor 9 in the axial direction is decided on the basis of the signal state of the position sensor 9 at the time when the distance between the detected plate 66 and the position sensor 9 is varied while the differential device 1 is maintained in the coupled state.

According to the first embodiment described above, the following functions and effects can be obtained.

(1) With the present embodiment, the insertion portion 91 is turnable in the through hole 810, and the flange portion 92 can be fixed to the sensor attachment member 8 at different positions at which the flange portion 92 is equidistant from the central axis $O_2$ of the through hole 810, in a state in which the position sensor 9 is not fixed to the sensor attachment member 8. The position of the position sensor 9 in the axial direction is varied by turning the insertion portion 91. Thus, the position of the position sensor 9 can be adjusted easily compared to a case where the position of the position sensor is adjusted through shim adjustment as in the differential device described in JP 2005-240861 A, for example.

(2) The sensor attachment member 8 has the long hole 811 which extends arcuately about the central axis $O_2$ of the through hole 810. The flange portion 92 is fixed to the sensor attachment member 8 by the bolt 900 in a shaft shape which is inserted through the long hole 811. That is, it is only necessary to fasten the bolt 900 in order to fix the position sensor 9 to the sensor attachment member 8. That is, the position sensor 9 can be fixed to the sensor attachment member 8 easily after the position of the position sensor 9 is adjusted.

(3) The sensor attachment member 8 has the inclined surface 81c which is inclined at a predetermined angle with respect to the circumferential direction about the central axis $O_2$ of the through hole 810. The flange portion 92 of the position sensor 9 is fixed to the inclined surface 81c at any position in the circumferential direction. With this configuration, the position of the position sensor 9 in the axial direction can be varied by just turning the insertion portion 91 when the position of the position sensor 9 in the axial direction is adjusted. That is, the position of the position sensor 9 in the axial direction can be adjusted with a simple configuration without separately providing a part for adjusting the position of the position sensor 9 in the axial direction.

Figure 8:
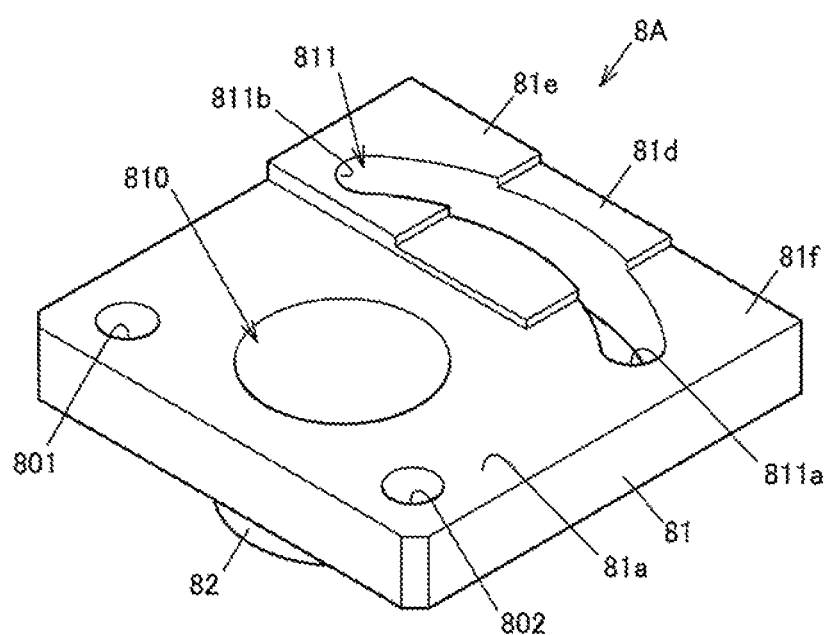
FIG. 8 is a perspective view illustrating an example of the configuration of a sensor attachment member according to a modification.
Figure 9A:
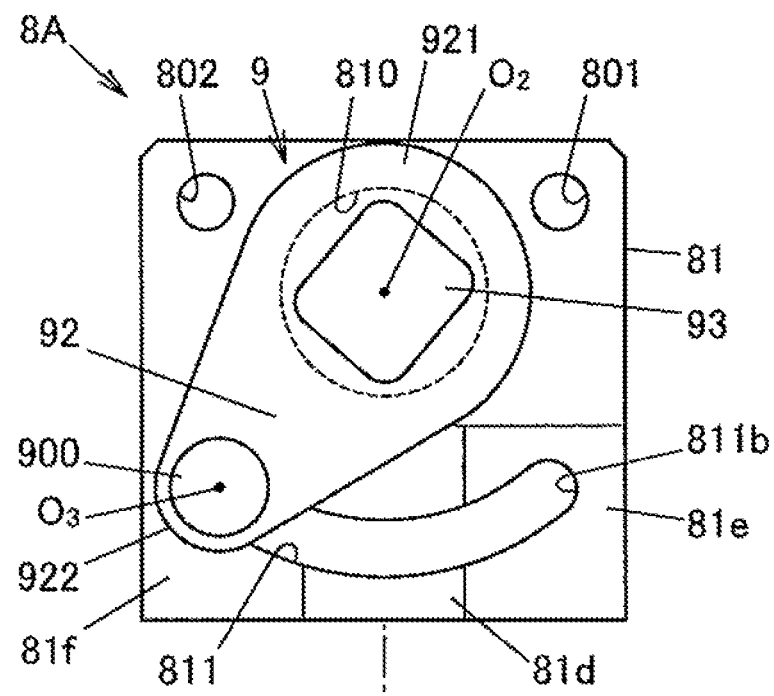
FIGS. 9A and 9B are a plan view and a side view, respectively, illustrating an example of the configuration of a position sensor and the sensor attachment member according to the modification, illustrating a state in which the position sensor is positioned on one end side of the sensor attachment member.
Figure 9B:
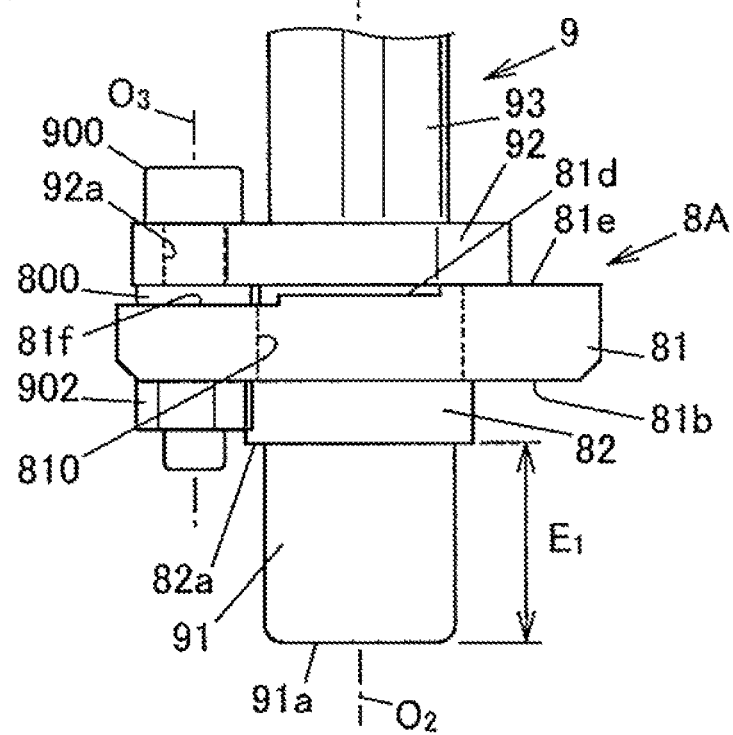
Figure 10A:
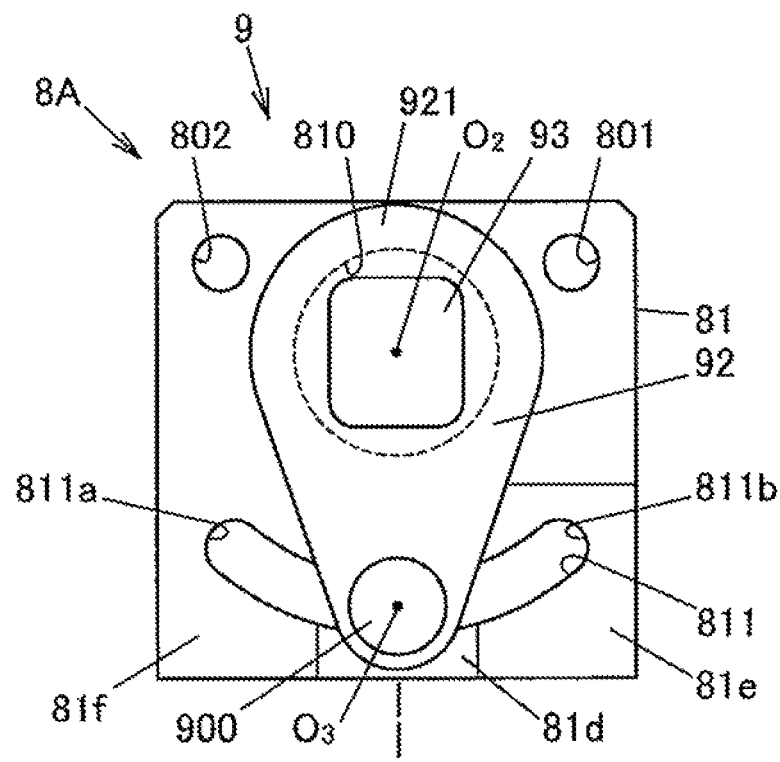
FIGS. 10A and 10B are a plan view and a side view, respectively, illustrating an example of the configuration of the position sensor and the sensor attachment member according to the modification, illustrating a state in which the position sensor is positioned at the middle between the one end and the other end of the sensor attachment member.
Figure 10B:
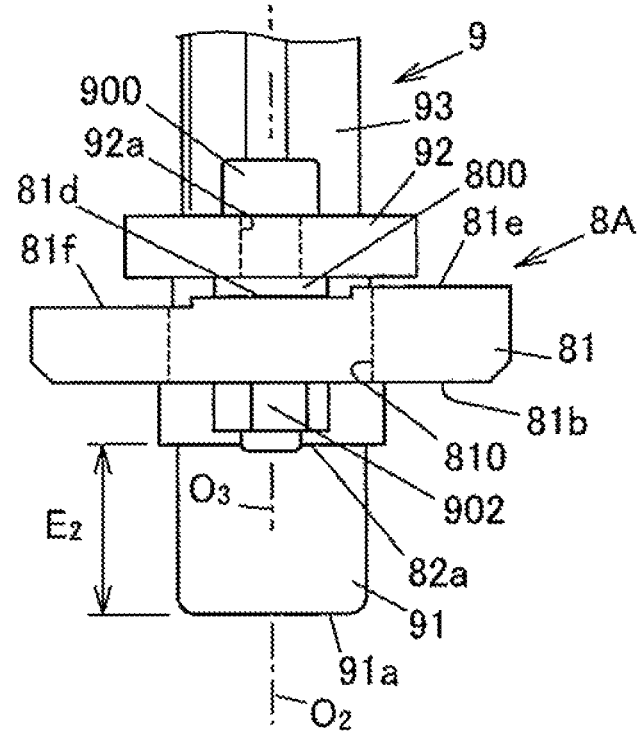
Figure 11A:
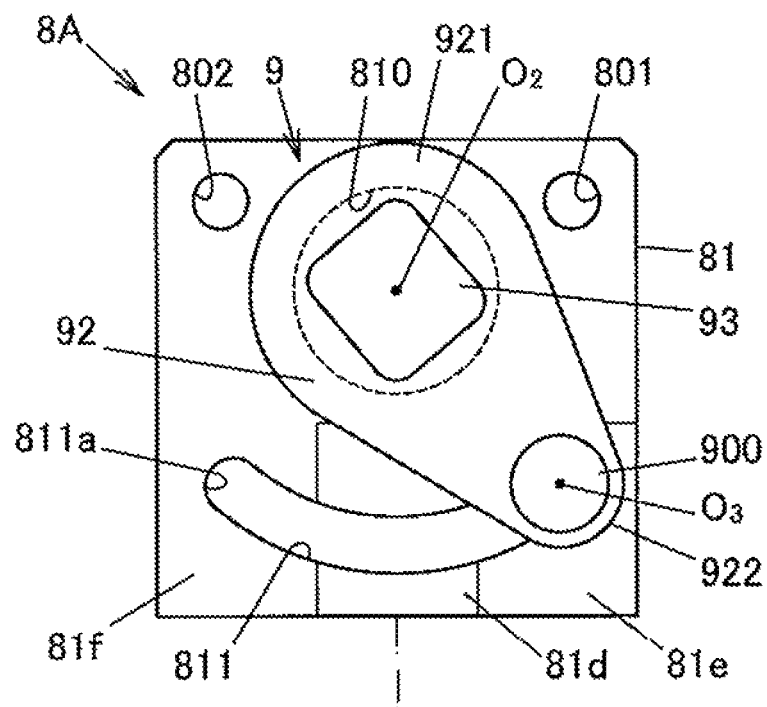
FIGS. 11A and 11B are a plan view and a side view, respectively, illustrating an example of the configuration of the position sensor and the sensor attachment member according to the modification, illustrating a state in which the position sensor is positioned on the other end side of the sensor attachment member.
Figure 11B:
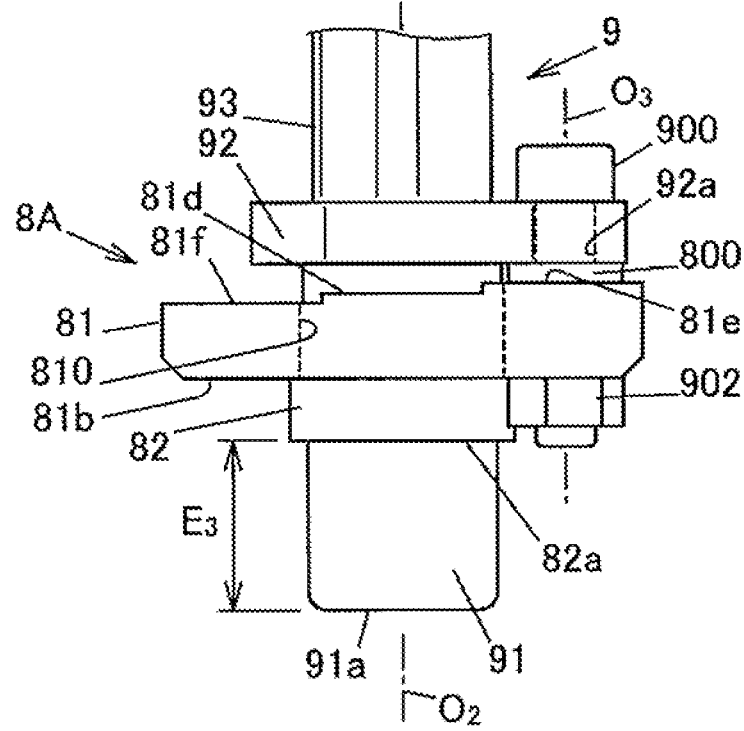

Next, a modification of the differential device 1 according to the first embodiment will be described with reference to FIGS. 8 to 10B. FIG. 8 is a perspective view illustrating an example of the configuration of a sensor attachment member 8A according to the modification. FIGS. 9A and 9B are a plan view and a side view, respectively, illustrating an example of the configuration of the sensor attachment member 8A and the position sensor 9 according to the modification, illustrating a state in which the position sensor 9 is turned to an end portion an one side of the sensor attachment member 8A. FIGS. 10A and 10B are a plan view and a side view, respectively, illustrating an example of the configuration of the sensor attachment member 8A and the position sensor 9 according to the modification, illustrating a state in which the position sensor 9 is turned to a middle position between the end portion on the one side and an end portion on the other side of the sensor attachment member 8A. FIGS. 11A and 11B are a plan view and a side view, respectively, illustrating an example of the configuration of the sensor attachment member 8A and the position sensor 9 according to the modification, illustrating a state in which the position sensor 9 is turned to the end portion on the other side of the sensor attachment member 8A.

The present modification differs from the first embodiment in the configuration of the sensor attachment member 8A. That is, while the sensor attachment member 8 according to the first embodiment has the inclined surface 81c, the sensor attachment member 8A according to the modification has a plurality of stepped surfaces in place of the inclined surface 81c.

As with the sensor attachment member 8 according to the first embodiment, the sensor attachment member 8A according to the modification has the body portion 81 and the cylindrical portion 82 which are integral with each other. The opening end surface 81a of the body portion 81 is a flat surface that is orthogonal to the central axis $O_2$ of the through hole 810. The washer 800, through which the bolt 900 is inserted, is disposed between the flange portion 92 of the position sensor 9 and the sensor attachment member 8A. Both end surfaces, in the axial direction, of the washer 800 are parallel to the opening end surface 81a of the body portion 81.

The body portion 81 has first and second stepped surfaces 81d and 81e in a staircase shape at different positions in the direction of the rotational axis $O_1$. Of the opening end surface 81a of the body portion 81, a surface that is adjacent to the first stepped surface 81d along the direction of arrangement of the first and second stepped surfaces 81d and 81e is defined as a reference surface 81f. The reference surface 81f is continuous with the opening end surface 81a with no step therebetween.

The first and second stepped surfaces 81d and 81e are parallel to the reference surface 81f of the body portion 81. When a direction that is parallel to the central axis $O_2$ of the through hole 810 and away from the cylindrical portion 82 is defined as the height direction, the first stepped surface 81d is formed to be higher in position in the axial direction than the reference surface 81f of the body portion 81, and the second stepped surface 81e is formed to be higher in position in the axial direction than the first stepped surface 81d. With this configuration, the position of the position sensor 9 in the axial direction can be varied in accordance with the height of the first and second stepped surfaces 81d and 81e in the axial direction.

More specifically, when the amount of projection of the insertion portion 91 from the axial end surface 82a of the cylindrical portion 82 of the sensor attachment member 8A at the time when the moving end 922 of the flange portion 92 of the position sensor 9 is positioned on the reference surface 81f is defined as $E_1$, the amount of projection of the insertion portion 91 from the axial end surface 82a of the cylindrical portion 82 of the sensor attachment member 8A at the time when the moving end 922 of the flange portion 92 of the position sensor 9 is positioned on the first stepped surface 81d is defined as $E_2$, and the amount of projection of the insertion portion 91 from the axial end surface 82a of the cylindrical portion 82 of the sensor attachment member 8A at the time when the moving end 922 of the flange portion 92 of the position sensor 9 is positioned on the second stepped surface 81e is defined as $E_3$, the amount of projection $E_1$ is larger than the amount of projection $E_2$, and the amount of projection $E_2$ is larger than the amount of projection $E_3$ ($E_1 > E_2 > E_3$). That is, the position, in the axial direction, of the distal end portion of the insertion portion 91 of the position sensor 9 is varied stepwise in accordance with the position of fixation of the flange portion 92 to the sensor attachment member 8A. In this way, the flange portion 92 of the position sensor 9 is fixed to any of the reference surface 81f and the first and second stepped surfaces 81d and 81e.

According to the present modification, the same functions and effects as those according to the first embodiment can be obtained. In the present modification, the sensor attachment member 8A has the reference surface 81f and the first and second stepped surfaces 81d and 81e in a staircase shape at different positions in the axial direction, and the flange portion 92 is fixed to any of the reference surface 81f and the first and second stepped surfaces 81d and 81e. Thus, the position sensor 9 can be stably fixed to the sensor attachment member 8A.

Figure 12:
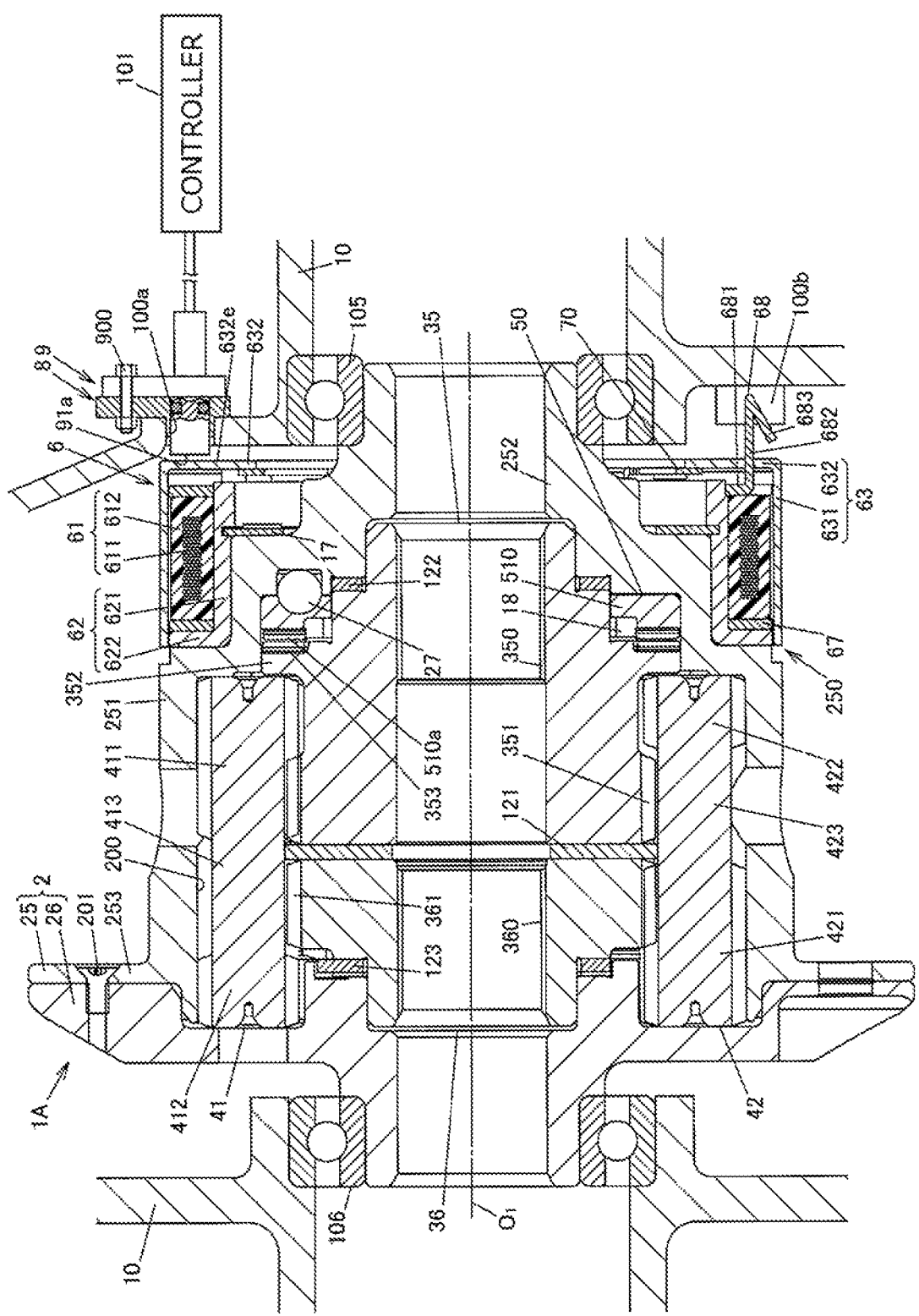
FIG. 12 is a sectional view illustrating an example of the configuration of a differential device according to a second embodiment.
Figure 13A:
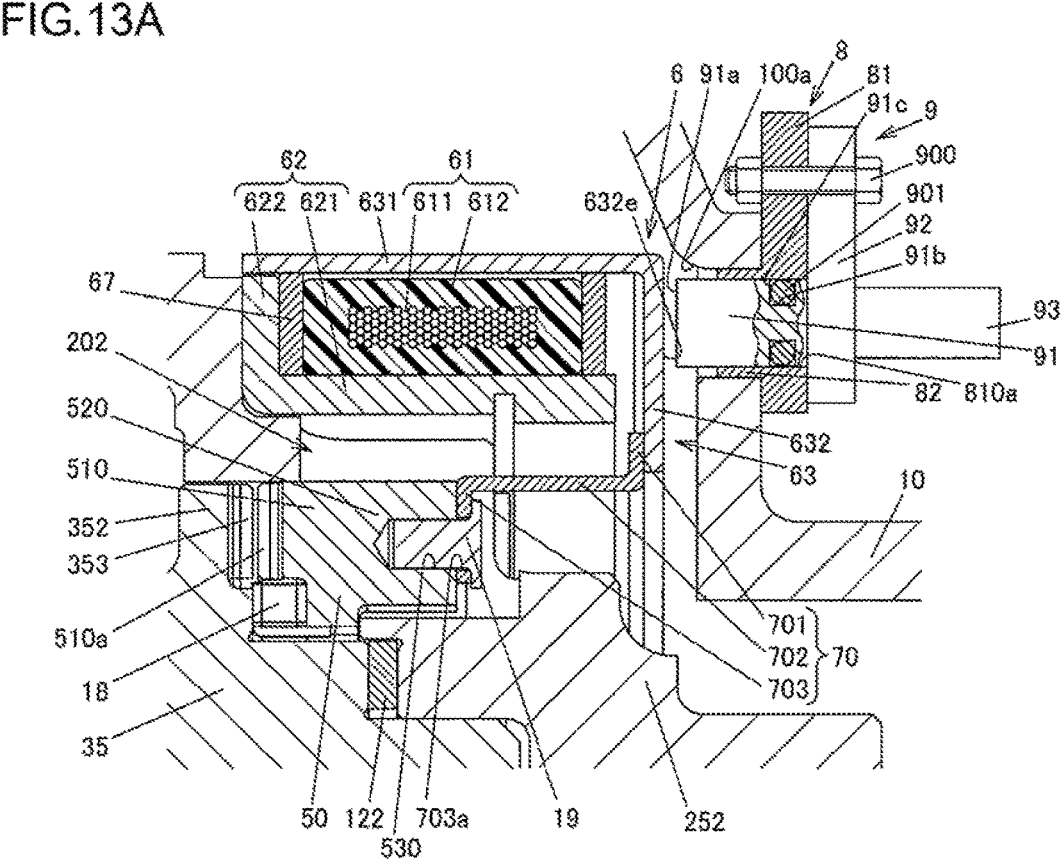
FIGS. 13A and 13B are partial sectional views illustrating the differential device according to the second embodiment at the time when an actuator is not operating and when the actuator is operating, respectively.
Figure 13B:
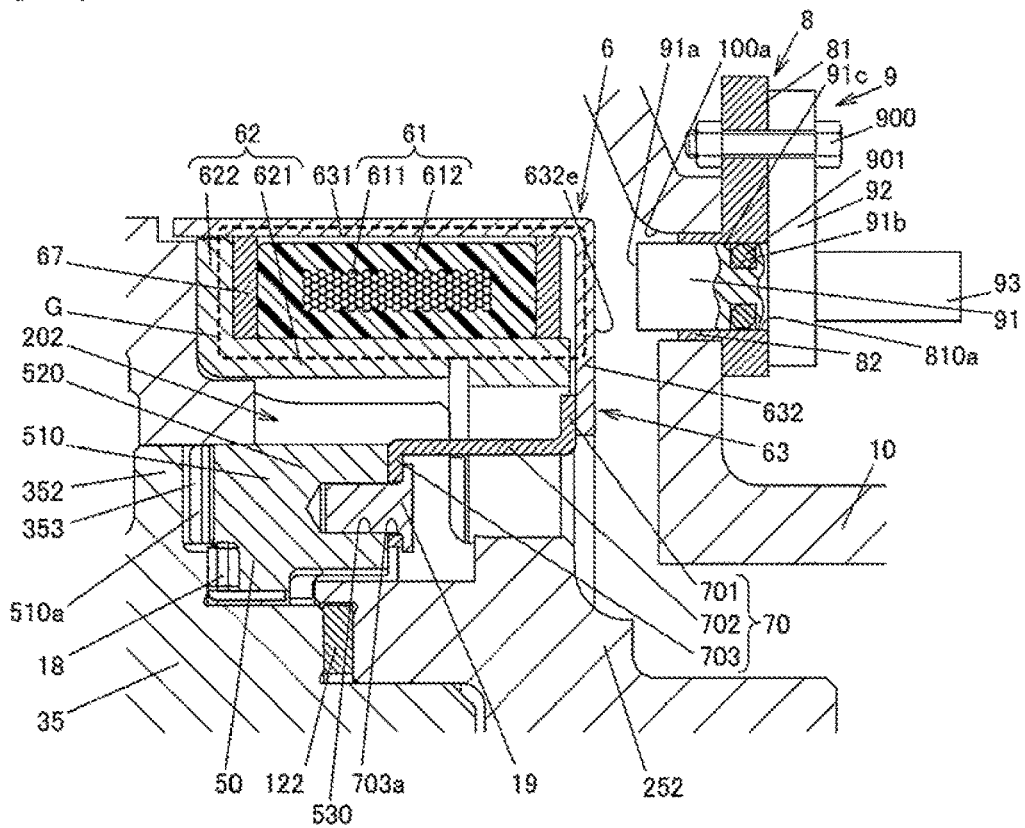

Next, a differential device according to a second embodiment will be described with reference to FIGS. 12 to 13B. FIG. 12 is a sectional view illustrating an example of the configuration of the differential device according to the second embodiment. FIGS. 13A and 13B are partial sectional views illustrating the differential device according to the second embodiment at the time when an actuator is not operating and when the actuator is operating, respectively.

A differential device 1A includes: a differential carrier 10 fixed to the vehicle body; a differential case 2 rotatably supported by the differential carrier 10; a first side gear 35 and a second side gear 36 housed in the differential case 2; a plurality of pinion gear sets that include first pinion gears 41 and second pinion gears 42 meshed with each other; an engagement/disengagement member 50 that is capable of allowing and blocking transfer of a drive force between the differential case 2 and the first side gear 35; an actuator 6 that moves the engagement/disengagement member 50; and a position sensor 9 that is attached to a sensor attachment member 8 that serves as a sensor attachment portion provided to the differential carrier 10 and that is capable of detecting an operating state of the actuator 6. The configuration of the sensor attachment member 8 and the position sensor 9 is the same as that according to the first embodiment.

The actuator 6 is controlled by the controller 101, and allows and blocks coupling between the differential case 2 and the first side gear 35 through movement of the engagement/disengagement member 50. When the differential case 2 and the first side gear 35 are coupled to each other by the engagement/disengagement member 50, the differential case 2 and the first side gear 35 are rotated together with each other. When the differential case 2 and the first side gear 35 are decoupled from each other, rotation of the first side gear 35 relative to the differential case 2 is allowed.

The first side gear 35 and the second side gear 36 have a tubular shape. A spline fitting portion 350, to which one of the output shafts is coupled so as not to be relatively rotatable, is formed in the inner peripheral surface of the first side gear 35. A spline fitting portion 360, to which the other output shaft is coupled so as not to be relatively rotatable, is formed in the inner peripheral surface of the second side gear 36.

The differential case 2 is supported so as to be rotatable with respect to the differential carrier 10, which is fixed to the vehicle body, via a pair of bearings 105 and 106. As illustrated in FIG. 12, the differential carrier 10 is provided with an attachment hole 100a for attachment of the position sensor 9 which outputs an electric signal that indicates the operation state of the actuator 6.

The differential case 2, the first side gear 35, and the second side gear 36 are disposed so as to be rotatable relative to each other about the common rotational axis $O_1$. Hereinafter, the direction which is parallel to the rotational axis $O_1$ will be referred to as the "axial direction". The engagement/disengagement member 50 is pressed by the actuator 6 to be moved in the axial direction.

The differential case 2 has a plurality of holding holes 200 that rotatably hold the first pinion gears 41 and the second pinion gears 42. The first pinion gears 41 and the second pinion gears 42 are revolvable about the rotational axis $O_1$, and rotatable in the holding holes 200 with their central axes serving as rotational axes.

The first side gear 35 and the second side gear 36 have the same outside diameter. Gear portions 351 and 361 that include a plurality of helical teeth are formed on the respective outer peripheral surfaces of the first side gear 35 and the second side gear 36. A center washer 121 is disposed between the first side gear 35 and the second side gear 36. A first side washer 122 is disposed at a side of the first side gear 35. A second side washer 123 is disposed at a side of the second side gear 36.

The first pinion gears 41 each have a long gear portion 411, a short gear portion 412, and a coupling portion 413 that couples the long gear portion 411 and the short gear portion 412 to each other in the axial direction. The long gear portion 411, the short gear portion 412, and the coupling portion 413 are integral with each other. Similarly, the second pinion gears 42 each have a long gear portion 421, a short gear portion 422, and a coupling portion 423 that couples the long gear portion 421 and the short gear portion 422 to each other in the axial direction. The long gear portion 421, the short gear portion 422, and the coupling portion 423 are integral with each other.

The long gear portion 411 of the first pinion gear 41 is meshed with the gear portion 351 of the first side gear 35 and the short gear portion 422 of the second pinion gear 42. The short gear portion 412 of the first pinion gear 41 is meshed with the long gear portion 421 of the second pinion gear 42. The long gear portion 421 of the second pinion gear 42 is meshed with the gear portion 361 of the second side gear 36 and the short gear portion 412 of the first pinion gear 41. The short gear portion 422 of the second pinion gear 42 is meshed with the long gear portion 411 of the first pinion gear 41.

In the case where the first side gear 35 and the second side gear 36 are rotated at the same speed as each other, the first pinion gears 41 and the second pinion gears 42 revolve together with the differential case 2 without rotating in the holding holes 200. When the rotational speeds of the first side gear 35 and the second side gear 36 are different from each other such as during a turn of the vehicle, for example, the first pinion gears 41 and the second pinion gears 42 revolve while rotating in the holding holes 200. Consequently, a drive force input to the differential case 2 is distributed to the first side gear 35 and the second side gear 36 while differential motion is allowed. The first side gear 35, the second side gear 36, and the first and second pinion gears 41 and 42 correspond to the differential mechanism according to the present invention.

The engagement/disengagement member 50 is movable in the axial direction between a coupled position, at which the engagement/disengagement member 50 couples the differential case 2 and the first side gear 35 to each other so as not to be relatively rotatable, and a non-coupled position, at which the engagement/disengagement member 50 allows relative rotation between the differential case 2 and the first side gear 35.

The engagement/disengagement member 50 has: an annular portion 510 disposed inside the differential case 2; and a plurality of leg portions 520 that project from an axial end surface of the annular portion 510 to be inserted through insertion through holes 202 formed in the differential case 2. The annular portion 510 and the leg portions 520 are integral with each other. Rotation of the engagement/disengagement member 50 relative to the differential case 2 is restricted, and the engagement/disengagement member 50 is movable in the axial direction with respect to the differential case 2. The annular portion 510 of the engagement/disengagement member 50 includes a plurality of meshing teeth 510a that project in the axial direction. FIG. 13A illustrates a state in which the engagement/disengagement member 50 is located at the non-coupled position. FIG. 13B illustrates a state in which the engagement/disengagement member 50 is located at the coupled position. The engagement/disengagement member 50 corresponds to the moving member according to the present invention.

When the engagement/disengagement member 50 is located at the coupled position, differential motion between the differential case 2 and the first side gear 35 is restricted to make the first pinion gears 41 and the second pinion gears 42 non-rotatable, and differential motion between the differential case 2 and the second side gear 36 is also restricted. The engagement/disengagement member 50 is urged toward the non-coupled position by a return spring 18 disposed between the first side gear 35 and the engagement/disengagement member 50.

The actuator 6 has: an electromagnet 61 in a circular ring shape that has a coil 611 that generates magnetic flux through energization; a yoke 62 that constitutes a part of a magnetic path G (see FIG. 13B) for magnetic flux of the electromagnet 61; an armature 63 made of a soft magnetic body that constitutes the magnetic path G together with the yoke 62 and that is moved in the axial direction together with the engagement/disengagement member 50; a transfer member 70 that transfers a moving force of the armature 63 to the engagement/disengagement member 50; a non-magnetic ring 67 interposed between the electromagnet 61 and the yoke 62; and a rotation prevention member 68 that is engageable so as not to be rotatable relative to the yoke 62.

The electromagnet 61 has: the coil 611 which is formed by winding an enameled wire; and the molded resin portion 612 which is molded with the coil 611 embedded therein. The yoke 62 has: the cylindrical portion 621 which is inserted through the inside of the electromagnet 61; and the rib portion 622 which bulges radially outward from one end portion, in the axial direction, of the cylindrical portion 621. The cylindrical portion 621 and the rib portion 622 are integral with each other. A plate 17 that restricts axial movement of the yoke 62 with respect to the differential case 2 is provided on the inner peripheral side of the cylindrical portion 621.

The armature 63 has: the outer annular portion 631 in a cylindrical shape; and the side plate portion 632 which is formed so as to extend radially inward from one end portion, in the axial direction, of the outer annular portion 631. The outer annular portion 631 and the side plate portion 632 are integral with each other. The transfer member 70 abuts against an end portion, on the inner peripheral side, of the side plate portion 632. An end surface 632e of the side plate portion 632 on the opposite side from the outer annular portion 631 in the axial direction faces the detection surface 91a of the position sensor 9. The end surface 632e of the armature 63 is formed as a detected surface to be detected by the position sensor 9.

The transfer member 70 is formed by pressing a plate material made of non-magnetic metal such as austenitic stainless steel, for example, and has: a ring-shaped annular portion 701 that abuts against the side plate portion 632 of the armature 63; three extension portions 702 that extend in the axial direction from the annular portion 701; and fixed portions 703 that project inward from the distal end portions of the extension portions 702 to be fixed to the engagement/disengagement member 50. The annular portion 701, the extension portions 702, and the fixed portions 703 are integral with each other. The annular portion 701 of the transfer member 70 is slid over the side plate portion 632 of the armature 63 to be rotated together with the differential case 2. The fixed portions 703 have insertion through holes 703a for insertion of press-fitting pins 19 for fixation to the engagement/disengagement member 50. The engagement/disengagement member 50 has insertion through holes 530 for insertion of the press-fitting pins 19.

The differential case 2 has a first case member 25 and a second case member 26 which are fixed to each other by a plurality of screws 201. The first case member 25 has: a cylindrical portion 251 in a cylindrical shape that rotatably holds the pinion gear sets; a bottom portion 252 that extends inward from one end portion of the cylindrical portion 251; and a flange portion 253 that abuts against the second case member 26. The cylindrical portion 251, the bottom portion 252, and the flange portion 253 are integral with each other. An annular recessed portion 250, in which the electromagnet 61 and the yoke 62 are disposed, is formed at the angle portion between the cylindrical portion 251 and the bottom portion 252.

The first side gear 35 and the second side gear 36 are disposed on the inner side of the cylindrical portion 251. The first case member 25 is made of metal with lower magnetic permeability than that of the yoke 62. A ring gear (not illustrated) is fixed to the flange portion 253. The differential case 2 is rotated about the rotational axis $O_1$ by a drive force transmitted to the ring gear.

When an excitation current is supplied to the electromagnet 61, magnetic flux is generated in the magnetic path G illustrated in FIG. 13B, and the side plate portion 632 of the armature 63 is attracted toward the rib portion 622 of the yoke 62. Consequently, the armature 63 is moved in the axial direction. The axial movement of the armature 63 moves the engagement/disengagement member 50, which is coupled to the armature 63 by the transfer member 70, in the axial direction.

A plurality of meshing teeth 353, with which the meshing teeth 510a of the engagement/disengagement member 50 are meshed, is formed on an annular wall portion 352 of the first side gear 35. The annular wall portion 352 is provided so as to project toward the outer peripheral side with respect to the gear portion 351.

When the engagement/disengagement member 50 is pressed by the armature 63 via the transfer member 70 to be moved to the coupled position, the meshing teeth 510a are meshed with the meshing teeth 353 of the first side gear 35. Consequently, the engagement/disengagement member 50 and the first side gear 35 are coupled so as not to be relatively rotatable. When the engagement/disengagement member 50 is moved to the non-coupled position by the urging force of the return spring 18, on the other hand, the meshing teeth 510a and 353 are not meshed with each other, and the engagement/disengagement member 50 and the first side gear 35 are relatively rotatable.

A spherical body 27 is disposed between the bottom portion 252 of the first case member 25 and the engagement/disengagement member 50. The spherical body 27 is held by the first case member 25 such that a part of the spherical body 27 is housed in a dent in the axial direction provided in the bottom portion 252. The first case member 25 and the engagement/disengagement member 50 generate a thrust in the axial direction that moves the engagement/disengagement member 50 away from the bottom portion 252 using a cam action via the spherical body 27.

The rotation prevention member 68 has: an annular body portion 681 externally fitted to the cylindrical portion 621 of the yoke 62; a pair of protruding portions 682 provided at two locations in the circumferential direction to project in the axial direction from the body portion 681; and projecting pieces 683 provided to the protruding portions 682 to serve as retention portions that retain the side plate portion 632 of the armature 63. The body portion 681, the protruding portions 682, and the projecting pieces 683 are integral with each other. The rotation prevention member 68 is prevented from rotating with respect to the differential carrier 10 with parts of the protruding portions 682 on the distal end side engaged with engagement portions 100b provided to the differential carrier 10.

In a state in which the meshing teeth 510a of the engagement/disengagement member 50 and the meshing teeth 353 of the first side gear 35 meshed with each other, relative rotation between the differential case 2 and the first side gear 35 is restricted, and a drive force is transferred from the differential case 2 to the first side gear 35 is the engagement/disengagement member 50. The first pinion gears 41 and the second pinion gears 42 are not rotatable, and differential motion between the differential case 2 and the second side gear 36 is also restricted. Consequently, differential motion between the first side gear 35 and the second side gear 36 is restricted. In a state in which the meshing teeth 510a of the engagement/disengagement member 50 are not meshed with the meshing teeth 353 of the first side gear 35, on the other hand, a drive force input to the differential case 2 is distributed to the first side gear 35 and the second side gear 36 while differential motion is allowed.

The operation state of the actuator 6 is detected by the position sensor 9. The position sensor 9 outputs an electric signal to the controller 101 via the wire 103 in accordance with the axial position of the armature 63. The signal state of the position sensor 9 is switched on and off in accordance with the distance between the detection surface 91a of the position sensor 9 and the end surface 632e of the side plate portion 632 of the armature 63.

In adjusting the position of the position sensor 9 in the axial direction, as in the first embodiment, a coupled state in which the meshing teeth 510a of the engagement/disengagement member 50 and the meshing teeth 353 of the first side gear 35 are meshed with each other in the circumferential direction may be established first by supplying the electromagnet 61 with an excitation current, and thereafter the position sensor 9 may be gradually moved away from the armature 63, while the insertion portion 91 of the position sensor 9 is turned, from a position at which the position sensor 9 is closest to the armature 63. The position sensor 9 then is fixed to the sensor attachment member 8 at the position of the position sensor 9 at the time when the signal state of the position sensor 9 is switched. Consequently, position adjustment and fixing work for the position sensor 9 are completed.

According to the present embodiment described above, the same functions and effects as those according to the first embodiment can be obtained.

What is claimed is:

1. A differential device comprising:
   a differential mechanism that distributes an input drive force to a pair of output members while allowing differential motion;
   a moving member that is configured to switch an operation state of the differential mechanism through advancing/retracting movement in an axial direction that is parallel to a rotational axis of the output members;
   an actuator that moves the moving member in the axial direction;
   a case member that houses the differential mechanism, the moving member, and the actuator; and
   a position sensor that is attached to a sensor attachment portion provided to the case member and that is configured to detect an operating state of the actuator, wherein:
   the position sensor has an insertion portion, a distal end portion of which is disposed inside the case member, and a flange portion disposed outside the case member;
   the sensor attachment portion has a through hole through which the insertion portion of the position sensor is inserted in the axial direction;
   the insertion portion is configured to turn about a central axis of the through hole in a state in which the flange portion is not fixed to the sensor attachment portion; and
   a position, in the axial direction, of the distal end portion of the insertion portion of the position sensor is varied in accordance with a position of fixation of the flange portion to the sensor attachment portion.

2. The differential device according to claim 1, wherein:
   the sensor attachment portion has a long hole that extends arcuately about the central axis of the through hole; and
   the flange portion is fixed to the sensor attachment portion by a fixing member in a shaft shape inserted through the long hole.

3. The differential device according to claim 1, wherein:
   the sensor attachment portion has an inclined surface inclined at a predetermined angle with respect to a circumferential direction, about the central axis of the through hole; and
   the flange portion is fixed to the inclined surface at any position in the circumferential direction.

4. The differential device according to claim 1, wherein:
   the sensor attachment portion has a plurality of stepped surfaces in a staircase shape such that the stepped surfaces are located at different positions in the axial direction; and
   the flange portion is fixed to any of the stepped surfaces.

5. A method of adjusting the differential device according to claim 1, the method comprising:
   fixing the flange portion to the sensor attachment portion at a position of the position sensor in the axial direction at a time when a signal state of the position sensor is switched when the position of the position sensor in the axial direction is varied.

\* \* \* \* \*